United States Patent
Kawakubo

(10) Patent No.: US 10,899,196 B2
(45) Date of Patent: Jan. 26, 2021

(54) REFRIGERATION CYCLE DEVICE

(71) Applicant: DENSO CORPORATION, Kariya (JP)

(72) Inventor: Masaaki Kawakubo, Kariya (JP)

(73) Assignee: DENSO CORPORATION, Kariya (JP)

( * ) Notice: Subject to any disclaimer, the term of this patent is extended or adjusted under 35 U.S.C. 154(b) by 209 days.

(21) Appl. No.: 16/224,611

(22) Filed: Dec. 18, 2018

(65) Prior Publication Data

US 2019/0118615 A1 Apr. 25, 2019

Related U.S. Application Data

(63) Continuation of application No. PCT/JP2017/018956, filed on May 22, 2017.

(30) Foreign Application Priority Data

Jun. 21, 2016 (JP) ................. 2016-122860

(51) Int. Cl.
| | |
|---|---|
| *F24F 1/14* | (2011.01) |
| *B60H 1/00* | (2006.01) |
| *F28F 9/02* | (2006.01) |
| *F25B 39/00* | (2006.01) |
| *F25B 41/04* | (2006.01) |
| *B60H 1/32* | (2006.01) |

(52) U.S. Cl.
CPC ...... *B60H 1/00907* (2013.01); *B60H 1/00485* (2013.01); *B60H 1/00885* (2013.01); *B60H 1/32* (2013.01); *F24F 1/14* (2013.01); *F25B 39/00* (2013.01); *F25B 41/04* (2013.01); *F28F 9/02* (2013.01)

(58) Field of Classification Search
CPC ............ B60H 1/00335; B60H 1/00485; B60H 1/00885; B60H 1/00907; B60H 1/00921; B60H 1/32; F24F 1/14; F25B 39/00; F25B 41/04; F28F 9/02
See application file for complete search history.

(56) References Cited

U.S. PATENT DOCUMENTS

| | | | |
|---|---|---|---|
| 8,695,689 B2 * | 4/2014 | Kohl ............... | F28D 1/05391 165/174 |
| 2004/0256091 A1 * | 12/2004 | Higashiyama ...... | F28D 1/05391 165/153 |
| 2008/0023182 A1 | 1/2008 | Beamer et al. | |

(Continued)

FOREIGN PATENT DOCUMENTS

| | | |
|---|---|---|
| CN | 105473977 A | 4/2016 |
| JP | H06023806 U | 3/1994 |

(Continued)

*Primary Examiner* — Filip Zec
(74) *Attorney, Agent, or Firm* — Harness, Dickey & Pierce, P.L.C.

(57) ABSTRACT

A refrigeration cycle device includes an exterior heat exchanger that includes a core portion including a stack of a plurality of tubes. The core portion has a first core portion, a second core portion and a third core portion each of which includes a tube group of the plurality of tubes. A flow direction of a refrigerant flowing through the second core portion in a heating operation is opposite to that in a cooling operation. Flow directions of the refrigerant flowing through the first core portion and the third core portion in the heating operation are same as those in the cooling operation.

9 Claims, 7 Drawing Sheets

(56) References Cited

U.S. PATENT DOCUMENTS

2008/0035305 A1* 2/2008 Wolk .................. F28F 9/02
165/42
2016/0216014 A1 7/2016 Morimoto et al.

FOREIGN PATENT DOCUMENTS

| JP | 2007278676 A | 10/2007 |
| JP | 2011235753 A | 11/2011 |
| JP | 2013002774 A | 1/2013 |

* cited by examiner

FIG. 1    HEATING OPERATION

COOLING OPERATION

HEATING OPERATION

COOLING OPERATION

REFRIGERATION CYCLE DEVICE

CROSS REFERENCE TO RELATED APPLICATION

The present application is a continuation application of International Patent Application No. PCT/JP2017/018956 filed on May 22, 2017, which designated the United States and claims the benefit of priority from Japanese Patent Application No. 2016-122860 filed on Jun. 21, 2016. The entire disclosures of all of the above applications are incorporated herein by reference.

TECHNICAL FIELD

The present disclosure relates to a refrigeration cycle device.

BACKGROUND

Conventionally, an exterior heat exchanger included in a refrigeration cycle device has functions as an evaporator in a heating operation and a condenser (radiator) in a cooling operation.

SUMMARY

According to at least one embodiment of the present disclosure, a refrigeration cycle device includes: a compressor configured to compress and discharge a refrigerant; a heating unit configured to heat blown air to be sent to an air conditioning target space by performing heat exchange between the refrigerant discharged from the compressor and the blown air; an exterior heat exchanger configured to perform heat exchange between the refrigerant and outside air; a first decompression unit configured to reduce pressure of the refrigerant flowing into the exterior heat exchanger; a second decompression unit configured to reduce pressure of the refrigerant flowing out of the exterior heat exchanger; an evaporator configured to cool the blown air before the heating unit heating the blown air, by performing heat exchange between the blown air and the refrigerant having a low pressure downstream of the second decompression unit; and a refrigerant flow path switching unit configured to switch a refrigerant flow path of the refrigerant circulating in a cycle. The refrigerant flow path switching unit, in a heating operation for heating the blown air, switches to a refrigerant flow path where the refrigerant which has released heat at least in the heating unit is decompressed at the first decompression unit and evaporated in the exterior heat exchanger. The refrigerant flow path switching unit, in a cooling operation for cooling the blown air, switches to a refrigerant flow path where the refrigerant which has released heat in the heating unit and the exterior heat exchanger is decompressed in the second decompression unit and evaporated in the evaporator. The exterior heat exchanger includes a core portion that includes a stack of a plurality of tubes through which the refrigerant flows. The core portion includes a first core portion, a second core portion and a third core portion each of which includes a tube group of the plurality of tubes. A flow direction of the refrigerant flowing through the second core portion in the heating operation is opposite to a flow direction of the refrigerant flowing through the second core portion in the cooling operation. Flow directions of the refrigerant flowing through the first and third core portions in the heating operation are same as flow directions of the refrigerant flowing through the first and third core portions in the cooling operation.

DETAILED DESCRIPTION

Figure 1:
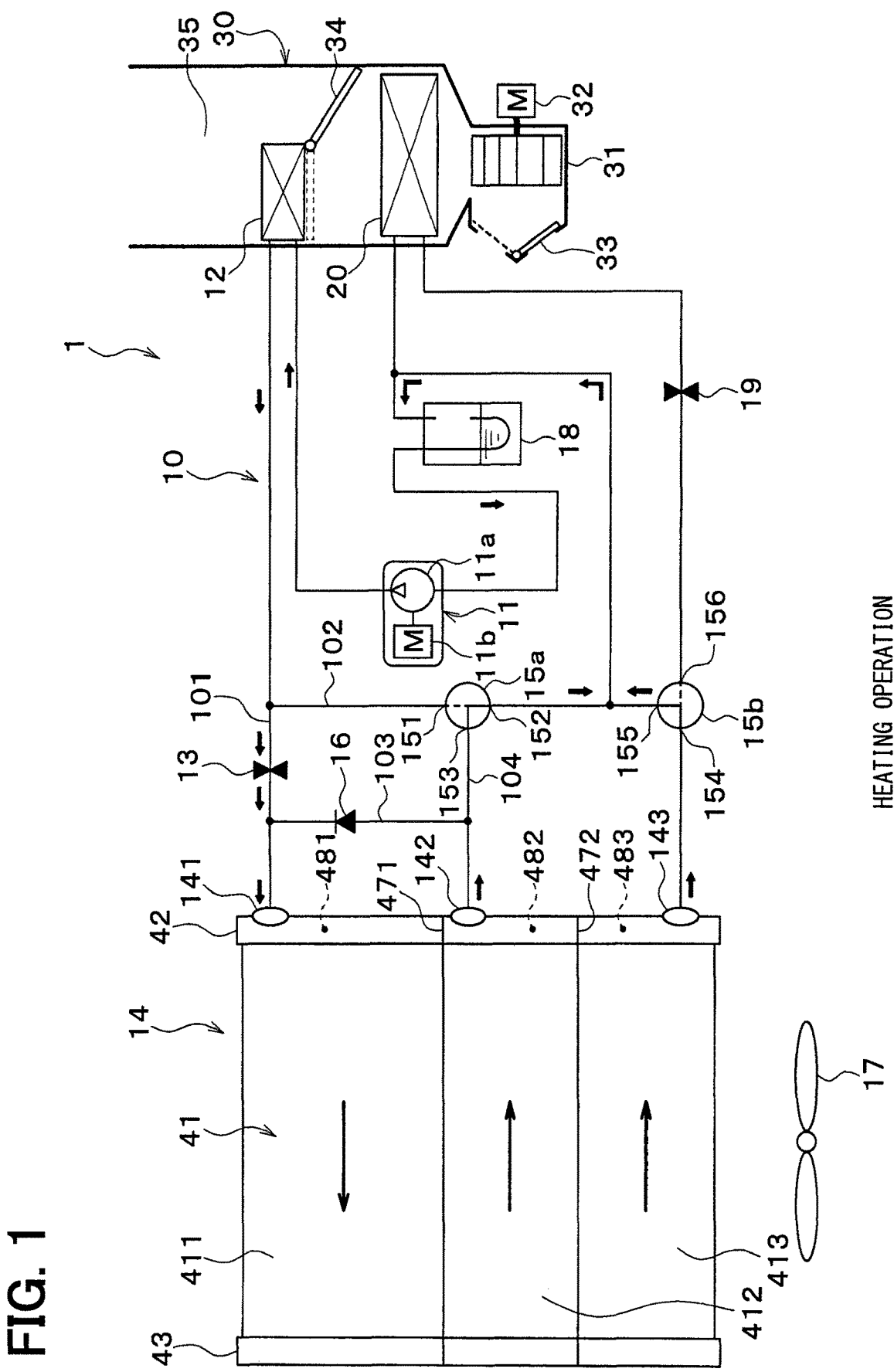
FIG. 1 is a schematic configuration diagram of a refrigeration cycle device in at least one embodiment, showing a state in a heating operation.

Hereinafter, multiple embodiments for implementing the present disclosure will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A first embodiment of the present disclosure will be described with reference to FIGS. 1 to 3. According to the present embodiment, a refrigeration cycle device 10 of vapor compression type according to the present disclosure is applied to a vehicle air conditioner 1. The refrigeration cycle device 10 in the vehicle air conditioner 1 has a function of heating or cooling blown air supplied into a vehicle interior that is an air conditioning target space.

The refrigeration cycle device 10 includes a compressor 11, an interior condenser 12, a heating fixed throttle 13, an exterior heat exchanger 14, and a cooling fixed throttle 19. The refrigeration cycle device 10 is capable of executing a heating operation for heating blown air to heat the vehicle interior, and a cooling operation for cooling blown air to cool the vehicle interior by switching refrigerant flow paths. In overall configuration diagrams of the refrigeration cycle device 10 shown in FIGS. 1 and 3, a flow of a refrigerant in each operation is indicated by solid-line arrows.

According to the refrigeration cycle device 10 of the present embodiment, an ordinary fluorocarbon refrigerant is adopted as the refrigerant to constitute a subcritical refrigeration cycle in which a high-pressure side refrigerant pressure does not exceed a critical pressure of the refrigerant. Refrigerating machine oil for lubricating the compressor 11 is mixed in this refrigerant. A part of the refrigerating machine oil circulates in the cycle together with the refrigerant.

The compressor 11 is disposed in an engine compartment to suck the refrigerant, compress the refrigerant, and discharge the compressed refrigerant in the refrigeration cycle device 10. The compressor 11 is a motor compressor that drives, by using an electric motor 11b, a fixed capacity type compressor 11a whose discharge capacity is fixed. Specifically, the fixed capacity type compressor 11a may adopt various types of compression mechanisms, such as a scroll type compression mechanism and a vane type compression mechanism.

The operation (rotation speed) of the electric motor 11b is controlled by a control signal output from an air conditioning control device that will be described later. The electric motor 11b may be either an alternating current motor or a direct current motor. By this rotation speed control, the refrigerant discharge capacity of the compressor 11 is varied. Accordingly, the electric motor 11b of the present embodiment constitutes a means for varying the discharge capacity of the compressor 11.

A refrigerant inlet side of the interior condenser 12 is connected to a refrigerant discharge port of the compressor 11. The interior condenser 12 is an example of a heating unit disposed in a casing 31 of an interior air conditioning unit 30 to perform heat exchange between a high temperature and high pressure refrigerant flowing inside the interior condenser 12, and vehicle interior blown air having passed through an interior evaporator 20 described below. The detailed configuration of the interior air conditioning unit 30 will be described later.

A first refrigerant passage 101 and a second refrigerant passage 102 are connected to a refrigerant outlet side of the interior condenser 12. The first refrigerant passage 101 guides the refrigerant flowing from the interior condenser 12 toward a refrigerant inflow portion 141 of the exterior heat exchanger 14 via the heating fixed throttle 13. The second refrigerant passage 102 guides the refrigerant flowing from the interior condenser 12 toward an inlet 151 of a first three-way valve 15a while bypassing the heating fixed throttle 13.

The heating fixed throttle 13 is a decompressing means for heating operation configured to decompress and expand the refrigerant flowing from the interior condenser 12 in the heating operation. The heating fixed throttle 13 is an example of a first decompression unit that reduces pressure of the refrigerant flowing into the exterior heat exchanger. The heating fixed throttle 13 may be constituted by an orifice, a capillary tube, or the like. The refrigerant inflow portion 141 of the exterior heat exchanger 14 is connected to an outlet side of the heating fixed throttle 13.

The first three-way valve 15a has the inlet 151, an outlet 152, and an inlet/outlet 153. The first three-way valve 15a is an electric three-way valve whose operation is controlled by a control voltage output from the air conditioning control device. The first three-way valve 15a has a function of switching between a refrigerant flow path connecting the inlet 151 and the inlet/outlet 153, and a refrigerant flow path connecting the inlet/outlet 153 and the outlet 152. Accordingly, the first three-way valve 15a constitutes a refrigerant flow path switching unit for switching flow paths of the refrigerant. The first three-way valve 15a of the present embodiment is an example of a first switching portion that switches between a refrigerant flow path for guiding the refrigerant flowing from the heating unit toward the first decompression unit, and a refrigerant flow path that guides the refrigerant flowing from the heating unit toward the exterior heat exchanger while bypassing the first decompression unit.

A third refrigerant passage 103 and a fourth refrigerant passage 104 are connected to the inlet/outlet 153 of the first three-way valve 15a. The third refrigerant passage 103 guides the refrigerant flowing from the inlet/outlet 153 of the first three-way valve 15a toward the refrigerant inflow portion 141 of the exterior heat exchanger 14. According to the present embodiment, the third refrigerant passage 103 is connected to an outlet side of the heating fixed throttle 13 in the first refrigerant passage 101.

A check valve 16 is disposed in the third refrigerant passage 103. The check valve 16 has a function of allowing only a flow of the refrigerant from the inlet/outlet 153 of the first three-way valve 15a toward the refrigerant inflow portion 141 of the exterior heat exchanger 14.

The fourth refrigerant passage 104 is a refrigerant flow path that connects the inlet/outlet 153 of the first three-way valve 15a and a refrigerant inflow-outflow portion 142 of the exterior heat exchanger 14. The fourth refrigerant passage 104 guides the refrigerant flowing from the inlet/outlet 153 of the first three-way valve 15a toward the refrigerant inflow-outflow portion 142 of the exterior heat exchanger 14 in the cooling operation. The fourth refrigerant passage 104 guides the refrigerant flowing from the refrigerant inflow-outflow portion 142 of the exterior heat exchanger 14 toward the refrigerant inlet/outlet 153 of the first three-way valve 15a in the heating operation.

An inlet side of an accumulator 18 described below is connected to the outlet 152 of the first three-way valve 15a.

More specifically, in the heating operation, the first three-way valve 15a switches to the refrigerant flow path that connects the refrigerant inflow-outflow portion 142 of the exterior heat exchanger 14 and the inlet side of the accumulator 18. In the cooling operation, the first three-way valve 15a switches to the refrigerant flow path that connects the outlet side of the interior condenser 12 and both the refrigerant inflow portion 141 and the refrigerant inflow-outflow portion 142 of the exterior heat exchanger 14.

A pressure loss generated when the refrigerant passes through the first three-way valve 15a is extremely smaller than a pressure loss generated when the refrigerant passes through the heating fixed throttle 13. Accordingly, when the first three-way valve 15a is open, that is, when the second refrigerant passage 102 and the fourth refrigerant passage 104 are connected, the refrigerant flowing from the interior condenser 12 enters the exterior heat exchanger 14 via the second to fourth refrigerant passages 102 to 104.

Accordingly, when the first three-way valve 15a is open, the refrigerant flowing from the interior condenser 12 enters the exterior heat exchanger 14 while bypassing the heating fixed throttle 13. On the other hand, when the first three-way valve 15a is close, that is, when the refrigerant inflow-outflow portion 142 of the exterior heat exchanger 14 and the inlet side of the accumulator are connected, the refrigerant flowing from the interior condenser 12 enters the exterior heat exchanger 14 via the heating fixed throttle 13.

The exterior heat exchanger 14 is a heat exchanger that performs heat exchange between the refrigerant flowing inside and the outside air supplied from a supply fan 17. The exterior heat exchanger 14 is disposed inside the engine compartment, and functions as an evaporating heat exchanger (evaporator) that evaporates a low-pressure refrigerant to cause a heat absorbing action in the heating operation, and as a condensing heat exchanger (condenser)

that releases heat from a high pressure refrigerant and condenses the high pressure refrigerant in the cooling operation.

The exterior heat exchanger 14 includes the refrigerant inflow portion 141 causing the refrigerant to flow into a core portion 41 (see FIG. 2) of the exterior heat exchanger 14, the refrigerant inflow-outflow portion 142 causing the refrigerant to flow into and from the core portion 41, and a refrigerant outflow portion 143 causing the refrigerant to flow from the core portion. The detailed configuration of the exterior heat exchanger 14 will be described below.

The supply fan 17 is an electric blower whose operation rate, that is, rotation speed (blown air amount) is controlled by a control voltage output from the air conditioning control device.

A second three-way valve 15b is connected to the refrigerant outflow portion 143 of the exterior heat exchanger 14. The second three-way valve 15b is an electric three-way valve whose operation is controlled by a control voltage output from the air conditioning control device.

The second three-way valve 15b includes an inlet 154, a first outlet 155, and a second outlet 156. The second three-way valve 15b has a function of switching between a refrigerant flow path connecting the inlet 154 and the first outlet 155, and a refrigerant flow path connecting the inlet 154 and the second outlet 156. Accordingly, the second three-way valve 15b constitutes a refrigerant flow path switching unit in cooperation with the first three-way valve 15a described above. The second three-way valve 15b of the present embodiment is an example of a second switching portion that switches between a refrigerant flow path for guiding the refrigerant flowing from the exterior heat exchanger toward the suction side of the compressor, and a refrigerant flow path that guides the refrigerant flowing from the exterior heat exchanger toward the second decompression unit.

The refrigerant outflow portion 143 of the exterior heat exchanger 14 is connected to the inlet 154 of the second three-way valve 15b. The inlet side of an accumulator 18 is connected to the first outlet 155 of the second three-way valve 15b. An inlet side of the cooling fixed throttle 19 described below is connected to the second outlet 156 of the second three-way valve 15b.

More specifically, in the heating operation, the second three-way valve 15b switches to a refrigerant flow path that connects the refrigerant outflow portion 143 of the exterior heat exchanger 14 and the inlet side of the accumulator 18. In the cooling operation, the second three-way valve 15b switches to a refrigerant flow path that connects the refrigerant outflow portion 143 of the exterior heat exchanger 14 and the inlet side of the cooling fixed throttle 19.

The cooling fixed throttle 19 is a decompressing means for the cooling operation configured to decompress and expand the refrigerant flowing from the exterior heat exchanger 14 in the cooling operation. The basic configuration of the cooling fixed throttle 19 is similar to the basic configuration of the heating fixed throttle 13. The cooling fixed throttle 19 is an example of a second decompression unit that reduces pressure of the refrigerant flowing from the exterior heat exchanger. The refrigerant inlet side of the interior evaporator 20 is connected to the outlet side of the cooling fixed throttle 19.

The interior evaporator 20 is a cooling unit disposed in the casing 31 of the interior air conditioning unit 30 on the airflow upstream side of the interior condenser 12 to perform heat exchange between the refrigerant flowing inside the interior evaporator 20 and the vehicle interior blown air to cool the vehicle interior blown air. The inlet side of the accumulator 18 is connected to a refrigerant outlet side of the interior evaporator 20.

The accumulator 18 is a low pressure side refrigerant gas-liquid separator that separates gas and liquid in the refrigerant flowing into the accumulator 18 and accumulates surplus refrigerant in the cycle. A suction side of the compressor 11 is connected to a gas-phase refrigerant outlet of the accumulator 18. Accordingly, the accumulator 18 has a function of reducing suction of the liquid-phase refrigerant into the compressor 11 to prevent liquid compression of the compressor 11.

The interior air conditioning unit 30 will be hereinafter described. The interior air conditioning unit 30 is disposed inside an instrument panel at a foremost part in the vehicle interior, and accommodates a blower 32, the interior condenser 12 described above, the interior evaporator 20, and others within the casing 31 that constitutes an outer casing of the interior air conditioning unit 30.

The casing 31 constitutes an air passage for the vehicle interior blown air supplied into the vehicle interior, and is made of resin having a certain degree of elasticity and excellent strength (e.g., polypropylene). An inside/outside air switching device 33 for selectively introducing vehicle interior air (inside air) and outside air is disposed on the most upstream side of the flow of the vehicle interior blown air within the casing 31.

The inside/outside air switching device 33 includes an inside air introduction port through which inside air is introduced into the casing 31, and an outside air introduction port through which outside air is introduced. Moreover, an inside/outside air switching door for continuously controlling opening areas of the inside air introduction port and the outside air introduction port is provided inside the inside/outside air switching device 33 to vary an air amount ratio of an inside air amount to an outside air amount.

The blower 32 that supplies air sucked via the inside/outside air switching device 33 toward the vehicle interior is disposed on the air flow downstream side of the inside/outside air switching device 33. The blower 32 is an electric blower that drives a centrifugal multi-blade fan (sirocco fan) by using an electric motor. The rotation speed (air supply amount) of the blower 32 is controlled by a control voltage output from the air conditioning control device.

On the air flow downstream side of the blower 32, the interior evaporator 20 and the interior condenser 12 are disposed in this order in the flow of the vehicle interior blown air. In other words, the interior evaporator 20 is disposed on the upstream side of the interior condenser 12 in the flow direction of the vehicle interior blown air.

On the downstream side of the air flow of the interior evaporator 20 and on the upstream side of the air flow of the interior condenser 12, an air mixing door 34 is further disposed to control a ratio of an amount of air passing through the interior condenser 12 in the blown air after passing through the interior evaporator 20. On the airflow downstream side of the interior condenser 12, a mixing space 35 is provided to mix blown air heated by heat exchange with the refrigerant in the interior condenser 12, and blown air having bypassed the interior condenser 12 and not heated.

A blowout opening through which conditioned air mixed in the mixing space 35 is blown into the vehicle interior as a cooling target space is disposed in the airflow most downstream portion of the casing 31. Specifically, this blowout opening is constituted by a face blowout opening through which conditioned air is blown toward the upper half of a passenger in the vehicle interior, a foot blowout opening through which conditioned air is blown toward the feet of the passenger, and a defroster blowout opening through which conditioned air is blown toward an inner side surface of vehicle front window glass (none of these openings is shown).

Accordingly, the temperature of the conditioned air mixed in the mixing space 35 is controlled by controlling the ratio of the air amount passing through the interior condenser 12 using the air mixing door 34, whereby the temperature of the conditioned air blown out from the respective blowout openings is controlled. That is, the air mixing door 34 constitutes a temperature control means for controlling the temperature of the conditioned air supplied into the vehicle interior.

In other words, the air mixing door 34 in the interior condenser 12 constituting the use side heat exchanger functions as a heat exchange amount control means for controlling a heat exchange amount between the refrigerant discharged from the compressor 11 and the vehicle interior blown air. The air mixing door 34 is driven by a not-shown servomotor whose operation is controlled by a control signal output from the air conditioning control device.

Furthermore, a face door for controlling the opening area of the face blowout opening, a foot door for controlling the opening area of the foot blowout opening, and a defroster door for controlling the opening area of the defroster blowout opening (none of these doors is shown) are disposed on the air flow upstream side of the face blowout opening, the foot blowout opening, and the defroster blowout opening, respectively.

These face door, foot door and defroster door constitute an air blowout opening mode switching means for switching an air blowout mode. An operation of the blowout opening mode switching means is driven by a not-shown servo motor whose operation is controlled by a control signal output from the air conditioning control device via a link mechanism or the like.

The detailed configuration of the exterior heat exchanger 14 of the present embodiment will be hereinafter described with reference to FIG. 2. In the front view of the exterior heat exchanger 14 shown in FIG. 2, a flow of the refrigerant in the heating operation is indicated by solid-line arrows, while a flow of the refrigerant in the cooling operation is indicated by broken-line arrows.

Figure 2:
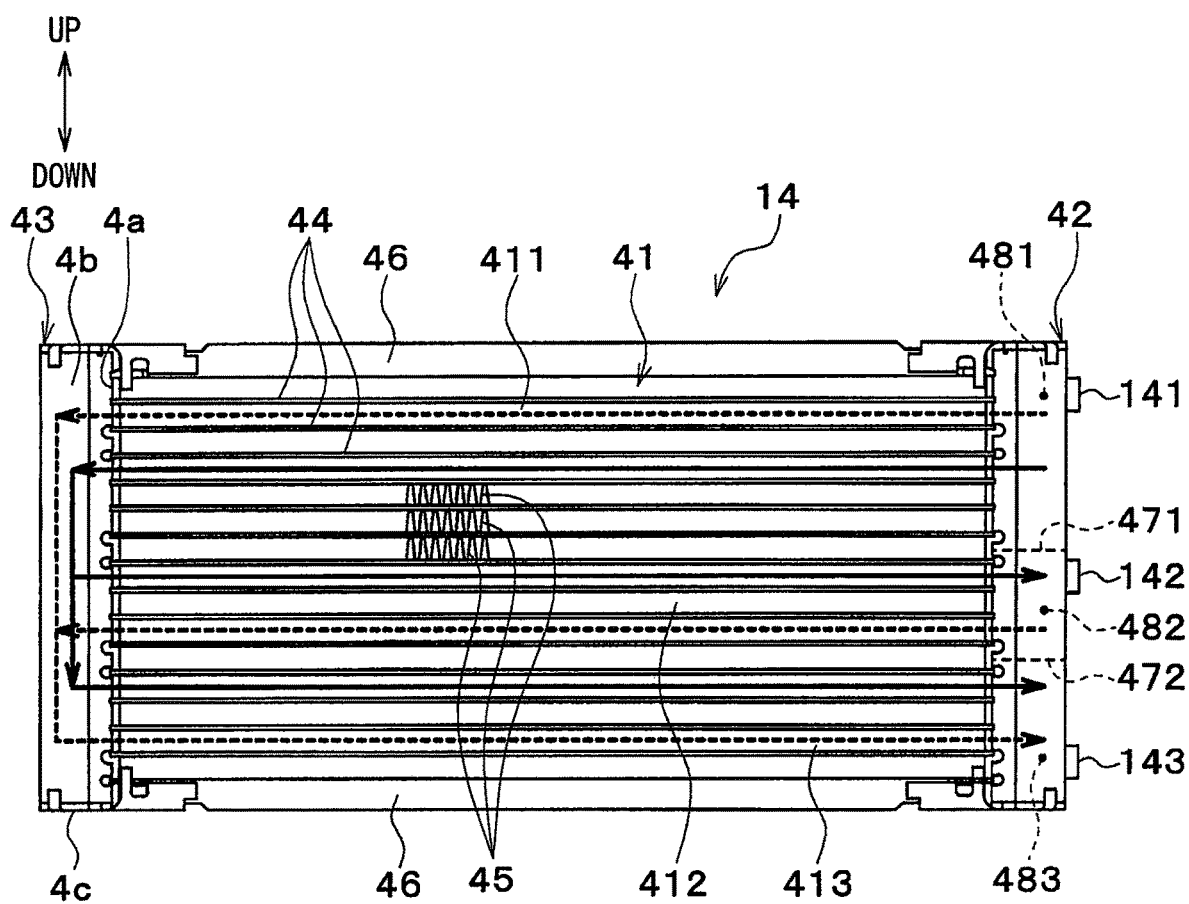
FIG. 2 is a front view showing an exterior heat exchanger in at least one embodiment.
Figure 3:
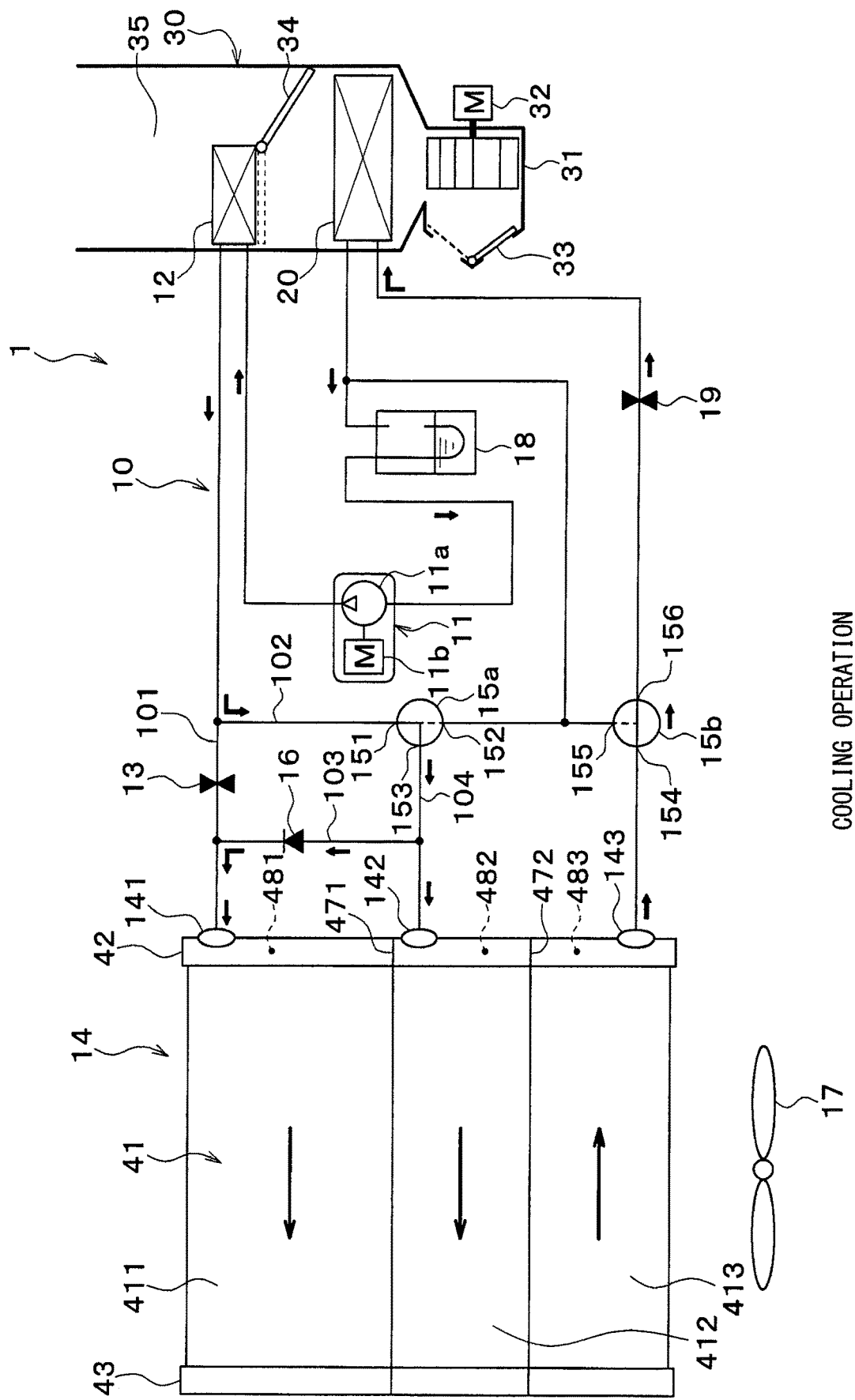
FIG. 3 is a schematic configuration diagram of the refrigeration cycle device in at least one embodiment, showing a state in a cooling operation.

As shown in FIG. 2, the exterior heat exchanger 14 is constituted by the core portion 41, and a pair of tank portions 42 and 43 disposed on the right and left sides of the core portion 41, respectively.

The core portion 41 is constituted by a stack that alternately includes a plurality of tubes 44 extending in the horizontal direction, and fins 45 joined between the adjacent tubes 44. A stacking direction of the plurality of tubes 44 and the plurality of fins 45 in the stack is hereinafter referred to as a tube stacking direction.

Each of the tubes 44 is constituted by a flat tube that contains a refrigerant passage inside of which a refrigerant flows, and has a flat cross-sectional shape extending in the flowing direction of the outside air. The tubes 44 are made of metal having excellent heat conductivity (e.g., aluminum alloy). Each of the tubes 44 may be constituted by either a single-hole flat tube or a multiple-hole flat tube.

The plurality of tubes 44 are stacked at equal intervals in a substantially vertical direction so that flat faces of the respective tubes 44 are parallel to each other. Air passages through each of which the outside air flows are formed between the adjacent tubes 44. Fins 45 for promoting heat exchange between the refrigerant and the outside air are further disposed between the adjacent tubes 44.

Each of the fins 45 is a corrugated fin produced by bending a thin sheet material, which is made of the same material as that of the tubes 44, into a wave shape. A top portion of each of the fins 45 having a wave shape is joined to a flat surface of the corresponding tube 44 by brazing. In FIG. 2, only a part of the fins 45 are shown for clarification of illustration. However, the fins 45 are disposed substantially in the entire areas between the adjacent tubes 44.

The core portion 41 has a first core portion 411, a second core portion 412, and a third core portion 413 each of which is constituted by a tube group including a part of the plurality of tubes 44. That is, each of the first core portion 411, the second core portion 412, and the third core portion 413 are constituted by a different tube group.

More specifically, the first core portion 411 is constituted by a tube group including a part of the plurality of tubes 44. A tube group other than the tube group constituting the first core portion 411 in the plurality of tubes 44 is herein referred to as a remaining tube group.

The second core portion 412 is constituted by a part of the remaining tube group. The third core portion 413 is constituted by another part of the remaining tube group. In other words, the third core portion is constituted by a tube group other than the tube groups constituting the first core portion 411 and the second core portion 412 in the plurality of tubes 44.

According to the present embodiment, the first core portion 411, the second core portion 412, and the third core portion 413 are disposed in this order from the upper side to the lower side in the core portion 41.

The tank portions 42 and 43 are respectively disposed on both ends of the plurality of tubes 44 in the longitudinal direction (substantially horizontal direction). Each of the tank portions 42 and 43 is a tubular member having a shape extending in the tube stacking direction (substantially vertical direction), and collects or distributes the refrigerant flowing through the plurality of tubes 44.

More specifically, the tank portions 42 and 43 are made of the same material as that of the tubes 44. Each of the tank portions 42 and 43 has a tubular shape formed by a core plate 4a to which longitudinal ends of the respective tubes 44 are joined by brazing, and a tank main body portion 4b combined with the core plate 4a. Both ends of each of the tank portions 42 and 43 are closed by tank caps 4c as closing members. Needless to say, each of the tank portions 42 and 43 may be constituted by a tubular member or the like.

One of the pair of tank portions 42 and 43 is hereinafter referred to as the first tank portion 42, while the other of which is hereinafter referred to as the second tank portion 43. According to the present embodiment, the first tank portion 42 is disposed on the right side of the core portion 41, while the second tank portion 43 is disposed on the left side of the core portion 41.

One end side (right end side) of the tubes 44 in the longitudinal direction is connected to the first tank portion 42, while the other end side (left end side) of the tubes 44 in the longitudinal direction is connected to the second tank portion 43.

Side plates 46 for reinforcing the core portion 41 are respectively disposed at both ends of the core portion 41, i.e., the stack of the tubes 44 and the fins 45 in the tube stacking direction. The side plates 46 are joined to the fins 45 disposed on the outermost sides in the tube stacking direction.

A first partitioning member 471 and a second partitioning member 472 each having a plate shape and partitioning an internal space of the first tank portion 42 in the tube stacking direction are disposed inside the first tank portion 42. The first partitioning member 471 and the second partitioning member 472 are disposed with a space left from each other.

The inside of the first tank portion 42 is partitioned into three spaces in the tube stacking direction by the first partitioning member 471 and the second partitioning member 472. More specifically, the first partitioning member 471 and the second partitioning member 472 divide the inside of the first tank portion 42 into a first space 481 that communicates with the respective tubes 44 constituting the first core portion 411, a second space 482 that communicates with the respective tubes 44 constituting the second core portion 412, and a third space 483 that communicates with the respective tubes 44 constituting the third core portion 413.

The refrigerant inflow portion 141 through which low-pressure refrigerant decompressed by the heating fixed throttle 13 is introduced into the first space 481 is formed in the first tank portion 42 at a portion corresponding to the first space 481. The refrigerant inflow-outflow portion 142 through which the low-pressure refrigerant decompressed by the heating fixed throttle 13 is introduced into the second space 482, or through which the refrigerant is derived from the second space 482 into the suction side of the compressor 11 is formed in the first tank portion 42 at the portion corresponding to the second space 482. The refrigerant outflow portion 143 through which the refrigerant is derived from the third space 483 to the suction side of the compressor 11 is formed in the first tank portion 442 at a portion corresponding to the third space 483.

An electric control unit of the present embodiment will be hereinafter described. The air conditioning control device is constituted by a known microcomputer including a central processing unit (CPU), a read-only memory (ROM), a random-access memory (RAM), and the like, and peripheral circuits of the microcomputer. The air conditioning control device performs various calculations and processes under air conditioning control programs stored in the ROM to control operations of the respective air conditioning controllers 11, 15a, 15b, 17, 32, and the like connected to the output side.

Moreover, various types of air conditioning control sensors, such as an inside air sensor for detecting a vehicle interior temperature, an outside air sensor for detecting an outside air temperature, a solar radiation sensor for detecting a solar radiation amount inside the vehicle interior, an evaporator temperature sensor for detecting a blowout air temperature (evaporator temperature) of the interior evaporator 20, and a discharge refrigerant temperature sensor for detecting a temperature of a refrigerant discharged from the compressor 11, are connected to the input side of the air conditioning control device.

Furthermore, a not-shown operation panel disposed near the instrument panel in the fore part of the vehicle interior is connected to the input side of the air conditioning control device. Operation signals from various types of air conditioning operation switches provided on the operation panel are input to the air conditioning control device. The various types of air conditioning operation switches provided on the operation panel include an operation switch of the vehicle air conditioner, a vehicle interior temperature setting switch for setting a vehicle interior temperature, a selection switch for selecting operation modes, and others.

A control means for controlling the electric motor 11b of the compressor 11, the first three-way valve 15a, the second three-way valve 15b, and the like is integrated with the air conditioning control device, and controls operations of these components. According to the air conditioning control device of the present embodiment, a configuration for controlling the operation of the compressor 11 (hardware and software) constitutes a refrigerant discharge capacity control means, while a configuration for controlling the operations of the respective devices 15a and 15b constituting the refrigerant flow path switching means constitutes a refrigerant flow path control means.

An operation of a vehicle air conditioner 1 having the above configuration according to the present embodiment will be hereinafter described. The vehicle air conditioner 1 according to the present embodiment is capable of performing a heating operation for heating the vehicle interior, and a cooling operation for cooling the vehicle interior. Actions in each of the operations will be hereinafter described.

(a) Heating Operation

The heating operation starts when a heating operation mode is selected by the selection switch in a state that the operation switch of the operation panel is turned on (ON).

In the heating operation, the air conditioning control device initially switches the first three-way valve 15a to the refrigerant flow path that connects the refrigerant inflow-outflow portion 142 of the exterior heat exchanger 14 and the inlet side of the accumulator 18. As a result, the outlet side of the interior condenser 12 and the refrigerant inflow portion 141 of the exterior heat exchanger 14 are connected via the heating fixed throttle 13. Furthermore, in the heating operation, the air conditioning control device initially switches the second three-way valve 15b to the refrigerant flow path that connects the refrigerant outflow portion 143 of the exterior heat exchanger 14 and the inlet side of the accumulator 18.

As a result, the refrigeration cycle device 10 is switched to the refrigerant flow path through which the refrigerant flows as indicated by solid-line arrows in FIG. 1.

In this refrigerant flow path configuration, the air conditioning control device reads detection signals of the air conditioning control sensor group described above and operation signals of the operation panel. Based on values of the detection signals and the operation signals, a target blowout temperature TAO, which is a target temperature of air to be blown into the vehicle interior, is calculated.

Furthermore, based on the calculated target blowout temperature TAO and the detection signals of the sensor group, operation states of the respective air conditioning controllers connected to the output side of the air conditioning control device are determined.

For example, a refrigerant discharge capacity of the compressor 11, that is, a control signal output to the electric motor of the compressor 11, is determined in the following manner. Initially, a target evaporator blowout temperature TEO of the interior evaporator 20 is determined with reference to a control map stored in advance in the air conditioning control device based on the target blowout temperature TAO.

Based on a difference between the target evaporator blowout temperature TEO and a temperature of blowout air from the interior evaporator 20 detected by the evaporator temperature sensor, a control signal output to the electric motor of the compressor 11 is determined by using a feedback control method such that the temperature of the blowout air from the interior evaporator 20 approaches the target evaporator blowout temperature TEO.

A control signal output to the servo motor of the air mixing door 34 is determined based on the target blowout temperature TAO, the temperature of the blowout air from the interior evaporator 20, the temperature of the refrigerant discharged from the compressor 11 and detected by the discharge refrigerant temperature sensor, and the like such that the temperature of the air blown into the vehicle interior becomes a desired temperature for the passenger set by the vehicle interior temperature setting switch.

In the heating operation, the opening degree of the air mixing door 34 may be controlled such that a total amount of the vehicle interior blown air supplied from the blower 32 passes through the interior condenser 12.

Subsequently, the control signals and the like determined in the manner described above are output to the respective air conditioning controllers. Thereafter, until an operation stop of the vehicle air conditioner is requested by the operation panel, a control routine in the order of reading the detection signals and operation signals described above, calculating the target blowout temperature TAO, determining operation states of the respective air conditioning controllers, and outputting the control voltage and control signals is repeated for each predetermined control cycle.

This control routine is basically repeated in a similar manner in other operations.

According to the refrigeration cycle device 10, the high-pressure refrigerant discharged from the compressor 11 flows into the interior condenser 12 from the compressor 11 in the heating operation. The refrigerant flowing into the interior condenser 12 exchanges heat with the vehicle interior blown air supplied from the blower 32 and passing through the interior evaporator 20 to release heat. As a result, the vehicle interior blown air is heated.

The high-pressure refrigerant flowing from the interior condenser 12 flows into the heating fixed throttle 13 to be decompressed and expanded. The low-pressure refrigerant decompressed and expanded by the heating fixed throttle 13 flows into the exterior heat exchanger 14 from the refrigerant inflow portion 141. The low-pressure refrigerant flowing into the exterior heat exchanger 14 absorbs heat from the outside air supplied by the supply fan 17, and evaporates.

More specifically, as indicated by solid-line arrows in FIG. 2, the low-pressure refrigerant decompressed and expanded by the heating fixed throttle 13 flows from the refrigerant inflow portion 141 of the exterior heat exchanger 14 into the first space 481 of the first tank portion 42. The refrigerant having entered the first space 481 flows from the right side to the left side (from first tank portion 42 side to second tank portion 43 side) in the first core portion 411, and flows into the second tank portion 43. The refrigerant having entered the second tank portion 43 flows into both the second core portion 412 and the third core portion 413.

The refrigerant having entered the second core portion 412 flows from the left side to the right side (from second tank portion 43 side to first tank portion 42 side) in the second core portion 412, and flows into the second space 482 of the first tank portion 42. The refrigerant having entered the second space 482 flows from the refrigerant inflow-outflow portion 142.

On the other hand, the refrigerant having entered the third core portion 413 flows from the left side to the right side in the third core portion 413, and flows into the third space 483 of the first tank portion 42. The refrigerant having entered the third space 483 flows from the refrigerant outflow portion 143.

Returning to FIG. 1, the refrigerant flowing from the refrigerant inflow-outflow portion 142 of the exterior heat exchanger 14 flows into the accumulator 18 and is separated into gas and liquid in a state that the first three-way valve 15a is switched to the refrigerant flow path connecting the refrigerant inflow-outflow portion 142 of the exterior heat exchanger 14 and the inlet side of the accumulator 18. In addition, the refrigerant flowing from the refrigerant outflow portion 143 of the exterior heat exchanger 14 flows into the accumulator 18 and is separated into gas and liquid in a state that the second three-way valve 15b is switched to the refrigerant flow path connecting the refrigerant outflow portion 143 of the exterior heat exchanger 14 and the inlet side of the accumulator 18.

Then, the gas-phase refrigerant separated by the accumulator 18 is sucked into the compressor 11 and compressed again. According to the present embodiment, the refrigerant flowing from the refrigerant inflow-outflow portion 142 of the exterior heat exchanger 14 and the refrigerant flowing from the refrigerant outflow portion 143 of the exterior heat exchanger 14 are joined at the outlet side of each of the first three-way valve 15a and the second three-way valve 15b.

As described above, in the heating operation, the interior condenser 12 heats the vehicle interior blown air by an amount of heat of the refrigerant discharged from the compressor 11. Accordingly, heating of the vehicle interior can be achieved.

(b) Cooling Operation

The cooling operation starts when a cooling operation mode is selected by the selection switch in a state that the operation switch of the operation panel is turned on (ON).

In the cooling operation, the air conditioning control device switches the first three-way valve 15a to the refrigerant flow path that connects the outlet side of the interior condenser 12 and both the refrigerant inflow portion 141 and the refrigerant inflow-outflow portion 142 of the exterior heat exchanger 14. As a result, the outlet side of the interior condenser 12 and the refrigerant inflow portion 141 and the refrigerant inflow-outflow portion 142 of the exterior heat exchanger 14 are connected with each other while bypassing the heating fixed throttle 13. In the cooling operation, the air conditioning control device switches the second three-way valve 15b to the refrigerant flow path that connects the refrigerant outflow portion 143 of the exterior heat exchanger 14 and the inlet side of the cooling fixed throttle 19. As a result, the refrigeration cycle device 10 is switched to the refrigerant flow path through which the refrigerant flows as indicated by solid-line arrows in FIG. 3.

In the cooling operation of the refrigeration cycle device 10, the high-pressure refrigerant discharged from the compressor 11 and flowing into the interior condenser 12 exchanges heat with the vehicle interior blown air supplied from the blower 32 and passing through the interior evaporator 20 to release heat.

The high-pressure refrigerant flowing from the interior condenser 12 enters the exterior heat exchanger 14 via the third refrigerant passage 103 and the fourth refrigerant passage 104 in a state that the first three-way valve 15a is switched to the refrigerant flow path that connects the outlet side of the interior condenser 12 and both the refrigerant inflow portion 141 and the refrigerant inflow-outflow portion 142 of the exterior heat exchanger 14. In this case, the high-pressure refrigerant flowing from the interior condenser 12 bypasses the heating fixed throttle 13 and flows into the exterior heat exchanger 14. The low-pressure refrigerant having entered the exterior heat exchanger 14 further releases heat to the outside air supplied from the supply fan 17.

More specifically, as indicated by broken-line arrows in FIG. 2, the high-pressure refrigerant flowing from the interior condenser 12 flows from the refrigerant inflow portion 141 of the exterior heat exchanger 14 into the first space 481 of the first tank portion 42, and flows from the refrigerant inflow-outflow portion 142 into the second space 482 of the first tank portion 42.

The refrigerant having entered the first space 481 flows from the right side to the left side (from first tank portion 42 side to second tank portion 43 side) in the first core portion 411, and flows into the second tank portion 43. The refrigerant having entered the second space 482 flows from the right side to the left side in the second core portion 412, and flows into the second tank portion 43.

The refrigerant having entered the second tank portion 43 flows from the left side to the right side in the third core portion 413, and flows into the third space 483 of the first tank portion 42. The refrigerant having entered the third space 483 flows from the refrigerant outflow portion 143.

Returning to FIG. 3, the refrigerant flowing from the refrigerant outflow portion 143 of the exterior heat exchanger 14 is decompressed and expanded at the cooling fixed throttle 19 in a state that the second three-way valve 15b is switched to the refrigerant flow path connecting the refrigerant outflow portion 143 of the exterior heat exchanger 14 and the inlet side of the cooling fixed throttle 19. The refrigerant flowing from the cooling fixed throttle 19 enters the interior evaporator 20, absorbs heat from the vehicle interior blown air supplied by the blower 32, and evaporates. As a result, the vehicle interior blown air is cooled.

The refrigerant flowing from the interior evaporator 20 enters the accumulator 18, and is separated into gas and liquid. Then, the gas-phase refrigerant separated by the accumulator 18 is sucked into the compressor 11 and compressed again. As described above, in the cooling operation, the low-pressure refrigerant absorbs heat from the vehicle interior blown air and evaporates at the interior evaporator 20. Accordingly, the vehicle interior blown air is cooled, thereby achieving cooling of the vehicle interior.

According to the vehicle air conditioner 1 of the present embodiment as described above, various operations can be executed by switching the refrigerant flow paths of the refrigeration cycle device 10. Furthermore, according to the present embodiment, the above-described characteristic exterior heat exchanger 14 is employed. Accordingly, heat exchange efficiency of the exterior heat exchanger 14 can be appropriately controlled for both the heating operation and the cooling operation.

More specifically, in the heating operation, the exterior heat exchanger 14 is so configured that both the refrigerant flowing into the first core portion 411 from the refrigerant inflow portion 141, and the refrigerant flowing into the second core portion 412 from the refrigerant inflow-outflow portion 142, flow into the third core portion 413, and flow from the refrigerant outflow portion 143. On the other hand, in the cooling operation, the exterior heat exchanger 14 is so configured that the refrigerant flowing into the first core portion 411 from the refrigerant inflow portion 141 flows into both the second core portion 412 and the third core portion 413, and flows from the refrigerant inflow-outflow portion 142 and the refrigerant outflow portion 143. In this case, the flow direction of the refrigerant flowing through the second core portion 412 in the heating operation is opposite to the corresponding flow direction in the cooling operation. In addition, the flow direction of the refrigerant flowing through the first core portion 411 and the third core portion 413 in the heating operation is equalized with the corresponding flowing direction in the cooling operation.

According to this configuration, the number of the tubes 44 of each of the refrigerant paths in the heating operation and the cooling operation can be adjusted to any number by controlling the number of the tubes 44 included in each of the first core portion 411, the second core portion 412, and the third core portion 413. In this case, the flow of the refrigerant in the exterior heat exchanger 14 in the heating operation and the cooling operation can be controlled in any way, wherefore heat exchange efficiency of the exterior heat exchanger 14 can be appropriately controlled for both the heating operation and the cooling operation.

In the heating operation, the tubes 44 forming the first core portion 411 constitute a first refrigerant path, while the tubes 44 forming the second core portion 412 and the third core portion 413 constitute a second refrigerant path. In the cooling operation, the tubes 44 forming the first core portion 411 and the second core portion 412 constitute a first refrigerant path, while the tubes 44 forming the third core portion 413 constitute a second refrigerant path.

In this case, the refrigerant in the exterior heat exchanger 14 flows from the upper side to the lower side for both the heating operation and in the cooling operation. In other words, the first refrigerant pass is disposed above the second refrigerant pass in the exterior heat exchanger 14 for both the heating operation and the cooling operation. Accordingly, designating opposite directions for the heating operation and the cooling operation concerning the refrigerant flow within the exterior heat exchanger 14 is not needed, wherefore the system can be simplified.

According to the present embodiment, on an assumption that: the number of the tubes 44 constituting the first core portion 411 is N1; the number of the tubes 44 constituting the second core portion 412 is N2; and the number of the tubes 44 constituting the third core portion 413 is N3, the number of tubes 44 included in the core portions 411 to 413 are so controlled so as to meet relationships of $N1<N2+N3$, and $N1+N2>N3$.

According to this configuration, the number of the tubes 44 constituting the second refrigerant path is made larger than the number of the tubes 44 constituting the first refrigerant path in the heating operation by controlling the number of the tubes 44 included in the respective core portions 411 to 413 such that the relationship $N1<N2+N3$ holds. In this case, in the heating operation in which the exterior heat exchanger 14 functions as an evaporator, a pressure loss of the refrigerant inside the exterior heat exchanger 14 can be reduced. Accordingly, heat exchange efficiency of the exterior heat exchanger 14 can increase in the heating operation.

Moreover, the number of the tubes 44 constituting the second refrigerant path is made smaller than the number of the tubes 44 constituting the first refrigerant path in the cooling operation by controlling the number of the tubes 44 included in the respective core portions 411 to 413 such that the relationship $N1+N2>N3$ holds. In this case, in the cooling operation in which the exterior heat exchanger 14 functions as a condenser, a flow speed of the refrigerant inside the exterior heat exchanger 14 can be raised. Accordingly, heat exchange efficiency of the exterior heat exchanger 14 can increase in the cooling operation.

Specifically, as shown in the following Table 1, heat exchange efficiency of the exterior heat exchanger 14 in both of the heating operation and the cooling operation can increase by controlling the number of the tubes 44 included in the respective core portions 411 to 413.

TABLE 1

| | | Ratio of number of tubes of exterior heat exchanger in cooling operation (first refrigerant path-second refrigerant path) | | | | |
|---|---|---|---|---|---|---|
| | | 90%-10% | 80%-20% | 70%-30% | 60%-40% | 50%-50% |
| Ratio of number of tubes of exterior heat exchanger in heating operation (first refrigerant path-second refrigerant path) | 10%-90% | 10%-80%-10% | 10%-70%-20% | 10%-60%-30% | 10%-50%-40% | 10%-40%-50% |
| | 20%-80% | 20%-70%-10% | 20%-60%-20% | 20%-50%-30% | 20%-40%-40% | 20%-30%-50% |
| | 30%-70% | 30%-60%-10% | 30%-50%-20% | 30%-40%-30% | 30%-30%-40% | 30%-20%-50% |
| | 40%-60% | 40%-50%-10% | 40%-40%-20% | 40%-30%-30% | 40%-20%-40% | 40%-10%-50% |
| | 50%-50% | 50%-40%-10% | 50%-30%-20% | 50%-20%-30% | 50%-10%-40% | |

For example, as indicated in thick solid-line frames in Table 1, when the ratio of the number of the tubes of the first refrigerant path to the number of the tubes of the second refrigerant path in the exterior heat exchanger 14 in the heating operation is desired to be designated as 40%:60%, and the ratio of the number of the tubes of the first refrigerant path to the number of the tubes of the second refrigerant path in the exterior heat exchanger 14 in the cooling operation is desired to be designated as 70%:30%, the ratio of the number of tubes of the first core portion 411, the second core portion 412, and the third core portion 413 is adjusted to 40%:30%:30%.

In addition, as indicated in thick broken-line frame in Table 1, when the ratio of the number of the tubes of the first refrigerant path to the number of the tubes of the second refrigerant path in the exterior heat exchanger 14 in the heating operation is desired to be designated as 20%:80%, and the ratio of the number of the tubes of the first refrigerant path to the number of the tubes of the second refrigerant path in the exterior heat exchanger 14 in the cooling operation is desired to be designated as 70%:30%, the ratio of the number of tubes of the first core portion 411, the second core portion 412, and the third core portion 413 is adjusted to 20%:50%:30%.

Second Embodiment

Figure 4:
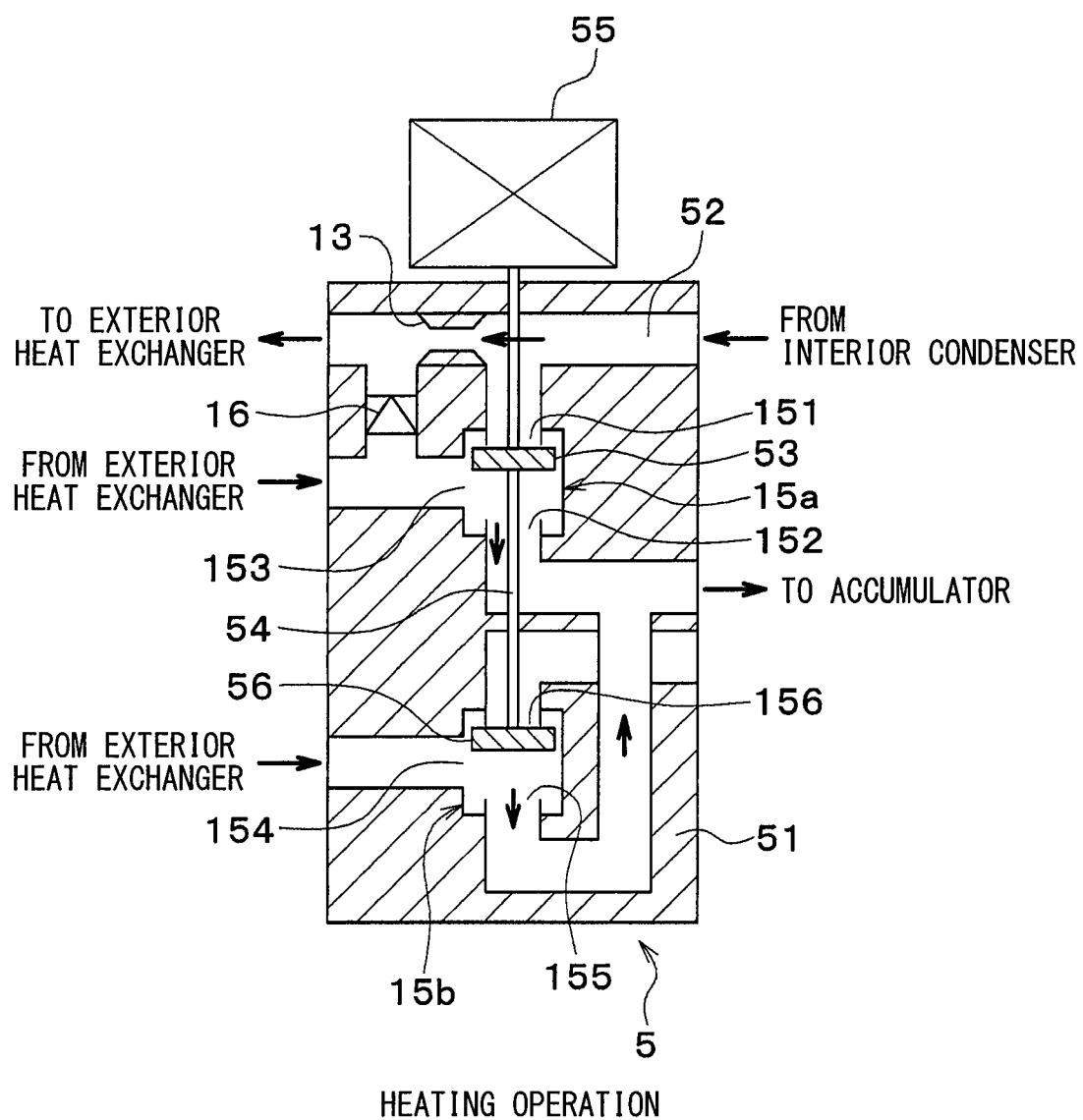
FIG. 4 is a schematic cross-sectional view showing a valve module in at least one embodiment, showing a state in a heating operation.

In the present embodiment, only parts different from the corresponding parts of the first embodiment will be described. According to the refrigeration cycle device 10 of the present embodiment, the heating fixed throttle 13, the first three-way valve 15a, the second three-way valve 15b, and the check valve 16 are integrated into a valve module 5 as shown in FIG. 4.

The valve module 5 has a housing 51 that integrally includes a refrigerant passage 52 through which a refrigerant flows, the heating fixed throttle 13, the first three-way valve 15a, the second three-way valve 15b, and the check valve 16. The housing 51 is formed into a predetermined shape by using an aluminum alloy die casting or aluminum alloy casting, for example.

The first three-way valve 15a has a first valve body 53 having a plate shape and opening and closing the inlet 151 and the outlet 152. The first valve body 53 reciprocates in the axial direction of the housing 51 (upward and downward direction in FIG. 4, hereinafter simply referred to as axial direction) within the housing 51.

Specifically, the inlet 151, the first valve body 53, and the outlet 152 are disposed in this order in the axial direction within the housing 51. Accordingly, when the first valve body 53 moves to one side in the axial direction (upward side in FIG. 4) and closes the inlet 151, the outlet 152 is opened. When the first valve body 53 moves to the other side in the axial direction (downward side in FIG. 4) and closes the outlet 152, the inlet 151 is opened.

The first valve body 53 is connected to an actuator 55 that drives the first valve body 53 via a shaft 54. The actuator 55 displaces the first valve body 53 in the axial direction. The operation of the actuator 55 is controlled by a control voltage output from the air conditioning control device.

The second three-way valve 15b has a second valve body 56 having a plate shape and opening and closing the first outlet 155 and the second outlet 156. The second valve body 56 reciprocates in the axial direction of the housing 51 within the housing 51.

Specifically, the second outlet 156, the second valve body 56, and the first outlet 155 are disposed in this order in the axial direction within the housing 51. Accordingly, when the second valve body 56 moves to one side in the axial direction (upward side in FIG. 4) and closes the second outlet 156, the first outlet 155 is opened. When the second valve body 56 moves to the other side in the axial direction (downward side in FIG. 4) and closes the first outlet 156, the second outlet 155 is opened.

Furthermore, in the present embodiment, the second valve body 56 is connected to the actuator 55 via the shaft 54 that is identical to the shaft of the first valve body 53. Accordingly, the first valve body 53 and the second valve body 56 are driven by the common actuator 55.

The valve module 5 is so configured that the second valve body 56 closes the second outlet 156 when the first valve body 53 closes the inlet 151, and that the second valve body 56 closes the first outlet 155 when the first valve body 53 closes the outlet 152.

Figure 5:
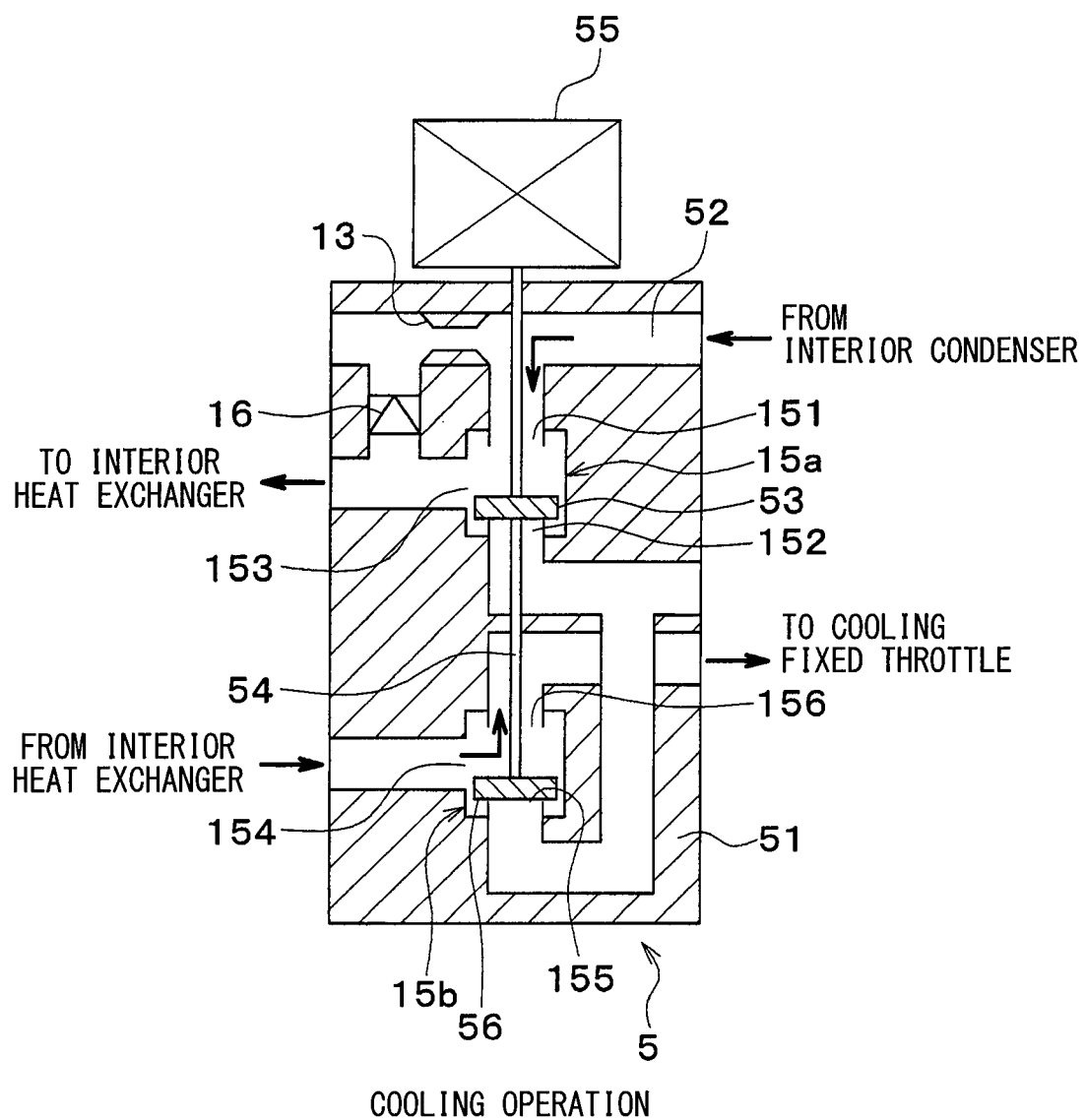
FIG. 5 is a schematic cross-sectional view showing the valve module in at least one embodiment, showing a state in a cooling operation.

More specifically, in the heating operation, the valve module 5 displaces the first valve body 53 and the second valve body 56 such that the first valve body 53 closes the inlet 151, and that the second valve body 56 closes the second outlet 156. On the other hand, in the cooling operation, the valve module 5 displaces the first valve body 53 and the second valve body 56 such that the first valve body 53 closes the outlet 152, and that the second valve body 56 closes the first outlet 155 as shown in FIG. 5.

In the refrigeration cycle device 10 of the present embodiment described above, the first three-way valve 15a, the second three-way valve 15b, and the heating fixed throttle 13 are integrated into a single body. According to this configuration, mountability for mounting the first three-way valve 15a, the second three-way valve 15b and the heating fixed throttle 13 on a product such as a vehicle can improve.

Moreover, in the present embodiment, the first valve body 53 of the first three-way valve 15a and the second valve body 56 of the second three-way valve 15b are driven by the common actuator 55. According to this configuration, the number of actuators, which are driving means of the valve bodies, decreases. Accordingly, reduction of the number of parts is achievable. Furthermore, the refrigerant flow paths can be simultaneously switched via the one actuator 55 by using the first three-way valve 15a and the second three-way valve 15b. Accordingly, control responsiveness can improve.

Third Embodiment

Figure 6:
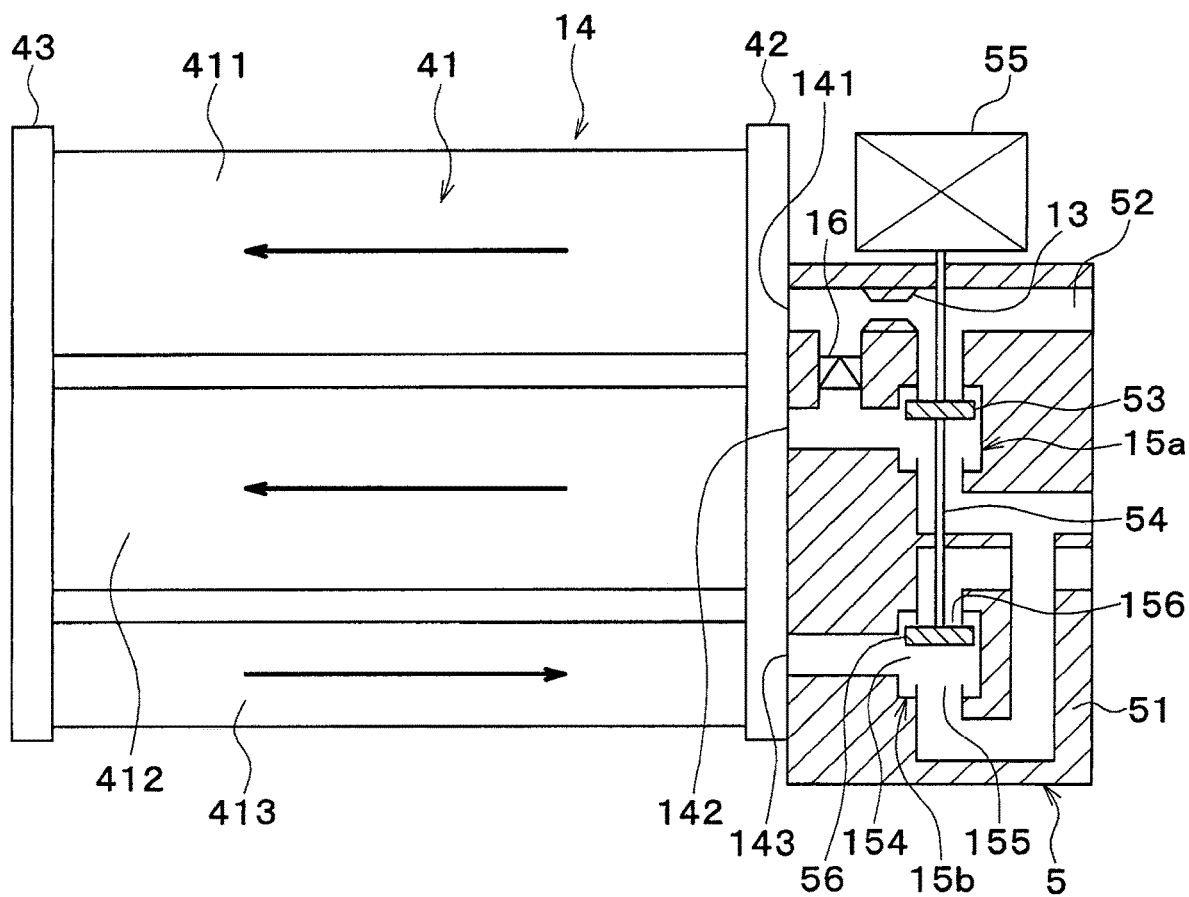
FIG. 6 is a schematic diagram showing an exterior heat exchanger and a valve module in at least one embodiment.

In the present embodiment, only parts different from the corresponding parts of the second embodiment will be described. According to the refrigeration cycle device 10 of the present embodiment, the valve module 5 is integrated with the exterior heat exchanger 14 as shown in FIG. 6.

The valve module 5 is integrated with the first tank portion 42 of the exterior heat exchanger 14. In this case, the refrigerant inflow portion 141, the refrigerant inflow-outflow portion 142, and the refrigerant outflow portion 143 of the first tank portion 42 each communicate with the refrigerant passage 52 of the valve module 5.

According to the refrigeration cycle device 10 of the present embodiment described above, the valve module 5, that is, the first three-way valve 15a, the second three-way valve 15b, and the heating fixed throttle 13 are integrated with the exterior heat exchanger 14. In this configuration, the mountability for mounting the first three-way valve 15a, the second three-way valve 15b, the heating fixed throttle 13, and the exterior heat exchanger 14 on a product such as a vehicle can improve.

Fourth Embodiment

Figure 7:
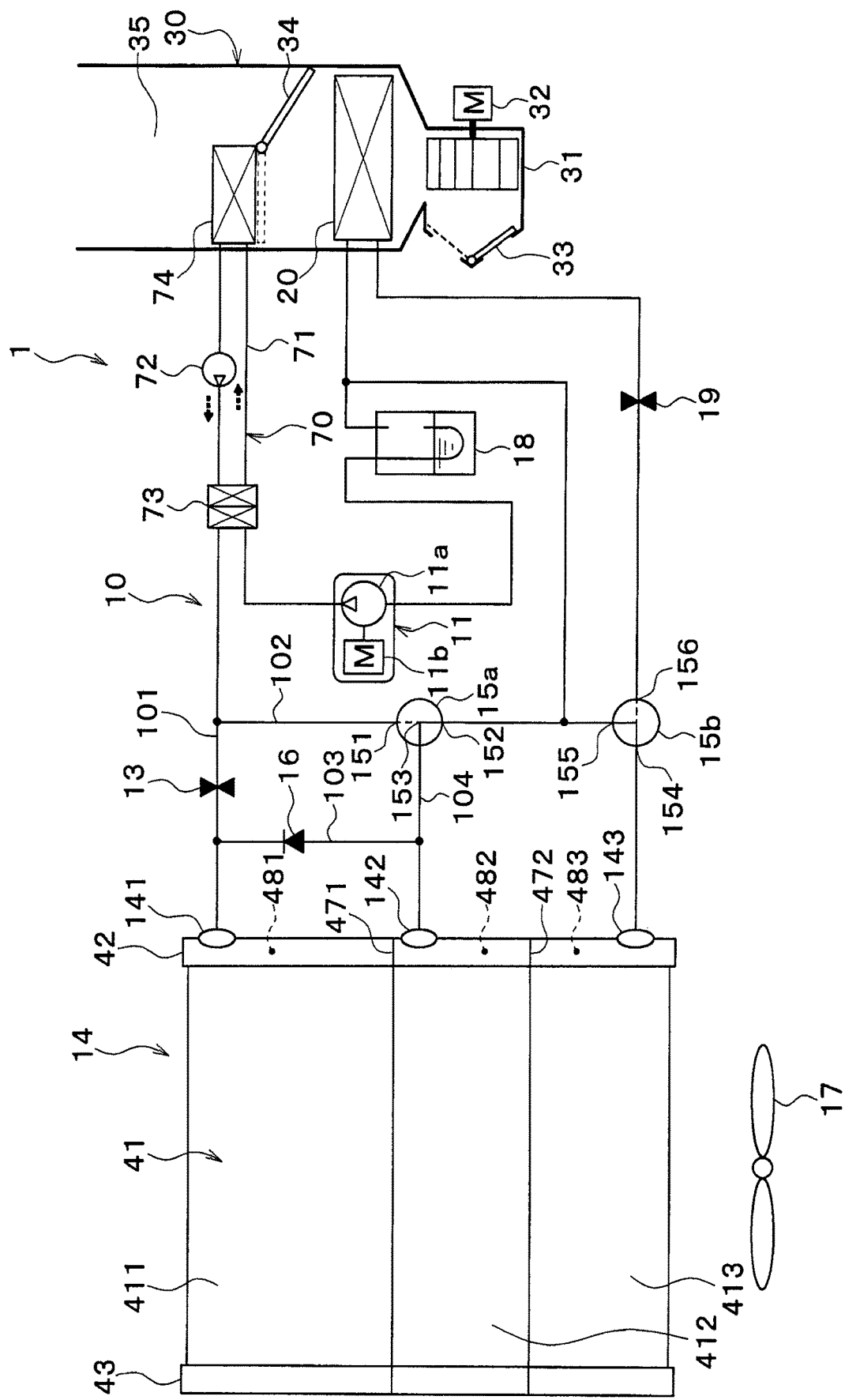
FIG. 7 is a schematic configuration diagram of a refrigeration cycle device in at least one embodiment.

In the present embodiment, an example that includes a heating unit in FIG. 7 modified from that of the first embodiment will be described. A heating device 70, which is an example of the heating unit of the present embodiment, includes a heat medium circulation circuit 71 for circulating a heat medium, a heat medium pump 72 disposed in the heat medium circulation circuit 71, a heat medium-refrigerant heat exchanger 73, and a heater core 74.

The heat medium-refrigerant heat exchanger 73 heats the heat medium by heat exchange between the refrigerant discharged from the compressor 11 and the heat medium. Similarly to the interior condenser 12 described in the first embodiment, the heater core 74 is disposed in the casing 31, and heats blown air by using, as a heat source, the heat medium heated by the heat medium-refrigerant heat exchanger 73.

The heat medium pump 72 is an electric pump that pressure-feeds the heat medium flowing from the heater core 74 toward the heat medium-refrigerant heat exchanger 73. According to the present embodiment, the heat medium circulates through the heat medium pump 72, the heat medium-refrigerant heat exchanger 73, the heater core 74, and the heat medium pump 72 in this order when the heat medium pump 72 is operated. The operation of the heat medium pump 72 is controlled by a control voltage output from the air conditioning control device.

Accordingly, the heating device 70 of the present embodiment releases heat from the refrigerant discharged from the compressor 11, thereby heating the blown air using the released heat. Other configurations of the refrigeration cycle device 10 and the vehicle air conditioner 1 are similar to the corresponding configurations of the first embodiment.

An operation of the vehicle air conditioner 1 having the above configuration according to the present embodiment will be hereinafter described. In the present embodiment, the heat medium pump 72 is so operated that the air conditioning control device exerts a predetermined heat medium pressure-feeding capability in the heating operation. Accordingly, in the heating operation, the heat medium heated by the heat medium-refrigerant heat exchanger 73 can flow into the heater core 74 to heat the blown air.

Other operations are similar to the corresponding operations of the first embodiment. Accordingly, cooling and heating for the vehicle interior are achievable also by the vehicle air conditioner 1 of the present embodiment similarly to the first embodiment.

According to the present embodiment, the example that modifies the heating unit of the first embodiment has been described. The cooling unit may be modified in a similar manner. More specifically, as the cooling unit, a cooling device that includes a heat medium circulation circuit for cooling through which the heat medium circulates, a heat medium pump for cooling disposed in the heat medium circulation circuit for cooling, a heat medium-refrigerant heat exchanger for cooling, and a cooler core may be adopted instead of the interior evaporator 20.

More specifically, the heat medium-refrigerant heat exchanger for cooling may be of any type as long as the heat medium can be cooled by evaporating the refrigerant flowing from the cooling fixed throttle 19 to cause a heat absorbing action. The cooler core may be of any types as long as the cooler core is disposed within the casing 31 similarly to the interior evaporator 20 described in the first embodiment, and uses, as a cold heat source, the heat medium cooled by the cooling heat medium-refrigerant heat exchanger for cooling to cool the blown air.

Effects similar to the effects of the first embodiment can be offered by operating the heat medium pump for cooling so that the air conditioning control device exerts a predetermined heat medium pressure feeding capability at least in the cooling operation.

The present disclosure is not limited to the above-described embodiments. Various modifications, such as modifications described below, may be made without departing from the scope and spirit of the present disclosure. In addition, respective means disclosed in each of the above embodiments may be appropriately combined within a feasible range.

(1) In the above-described embodiment described by way of example, the heating fixed throttle 13 is adopted as the heating decompression means. However, the heating decompression means is not limited to this example. For example, a heating expansion valve, which is an electric variable throttle mechanism having a valve body and an electric actuator, may be adopted as the heating decompression means. The heating expansion valve may be constituted by a variable throttle mechanism that has a full-open function for full-opening the refrigerant passage when the throttle opening is full-opened. That is, the heating expansion valve is prevented from achieving a refrigerant decompression operation by full-opening the refrigerant passage. In this case, the operation of the heating expansion valve may be controlled by a control signal output from the air conditioning control device.

When the heating expansion valve is integrated with the first three-way valve 15a and the second three-way valve 15b as in the second and third embodiments, the heating expansion valve, the first three-way valve 15a, and the second three-way valve 15b may be driven by the common actuator 55. In this configuration, a dedicated electric actuator for driving the heating expansion valve can be eliminated, wherefore reduction of the number of parts is achievable. In this case, two of the heating expansion valve, the first three-way valve 15a, and the second three-way valve 15b may be driven by the common actuator 55.

Similarly, in the above-described embodiment described by way of example, the cooling fixed throttle 19 is adopted as the cooling decompression means. However, the cooling decompression means is not limited to this example. For example, a cooling expansion valve, which is an electric variable throttle mechanism having a valve body and an electric actuator, may be adopted as a cooling decompression means. The basic configuration of the cooling expansion valve may be similar to the basic configuration of the heating expansion valve described above.

(2) In the above-described embodiment described by way of example, the three core portions constituted by the first to third core portions 411 to 413 are provided as the core portion 41 of the exterior heat exchanger 14. However, the core portion is not limited to this example, but may be constituted by four or more core portions. In this case, the flow direction of the refrigerant in the heating operation is opposite to the flow direction of the refrigerant in the cooling operation in at least one of the four or more core portions, and the flow direction of the refrigerant in the heating operation is equalized with the flow direction of the refrigerant in the cooling operation in the other core portions.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

A comparative example will be described. According to an exterior heat exchanger of the comparative example, a plurality of partitions are provided inside a header tank. A predetermined one of the plurality of partitions includes a one-way valve to cancel a blocking function of the same partition in a specific refrigerant flow direction. In this manner, the refrigerant path of the exterior heat exchanger can be switched in accordance with the refrigerant flow direction. Accordingly, the exterior heat exchanger is allowed to have a refrigerant path configuration suitable for a condenser when the exterior heat exchanger functions as a condenser, and allowed to have a refrigerant path configuration appropriate for an evaporator when the exterior heat exchanger functions as an evaporator.

However, the exterior heat exchanger of the comparative example cannot change the number of tubes included in each of the refrigerant paths in accordance with the heating operation in which the exterior heat exchanger functions as the evaporator and the cooling operation in which the exterior heat exchanger functions as the condenser. Accordingly, detailed optimization of a flow of the refrigerant in the exterior heat exchanger may not be achieved for each of the operations. As a result, the exterior heat exchanger of the comparative example cannot appropriately control a heat exchange efficiency of the exterior heat exchanger in each of the heating operation and the cooling operation.

In contrast to the comparative example, a refrigeration cycle device according to the present disclosure is capable of appropriately controlling a heat exchange efficiency of an exterior heat exchanger in both a heating operation and a cooling operation.

According to at least one embodiment of the present disclosure, a refrigeration cycle device includes: a compressor configured to compress and discharge a refrigerant; a heating unit configured to heat blown air to be sent to an air conditioning target space by performing heat exchange between the refrigerant discharged from the compressor and the blown air; an exterior heat exchanger configured to perform heat exchange between the refrigerant and outside air; a first decompression unit configured to reduce pressure of the refrigerant flowing into the exterior heat exchanger; a second decompression unit configured to reduce pressure of the refrigerant flowing out of the exterior heat exchanger; an evaporator configured to cool the blown air before the heating unit heating the blown air, by performing heat exchange between the blown air and the refrigerant having a low pressure downstream of the second decompression unit; and a refrigerant flow path switching unit configured to switch a refrigerant flow path of the refrigerant circulating in a cycle. The refrigerant flow path switching unit, in a heating operation for heating the blown air, switches to a refrigerant flow path where the refrigerant which has released heat at least in the heating unit is decompressed at the first decompression unit and evaporated in the exterior heat exchanger. The refrigerant flow path switching unit, in a cooling operation for cooling the blown air, switches to a refrigerant flow path where the refrigerant which has released heat in the heating unit and the exterior heat exchanger is decompressed in the second decompression unit and evaporated in the evaporator. The exterior heat exchanger includes a core portion that includes a stack of a plurality of tubes through which the refrigerant flows. The core portion includes a first core portion, a second core portion and a third core portion each of which includes a tube group of the plurality of tubes. A flow direction of the refrigerant flowing through the second core portion in the heating operation is opposite to a flow direction of the refrigerant flowing through the second core portion in the cooling operation. Flow directions of the refrigerant flowing through the first and third core portions in the heating operation are same as flow directions of the refrigerant flowing through the first and third core portions in the cooling operation.

According to this configuration, the number of the tubes of each of the refrigerant paths in the heating operation and the cooling operation can be arbitrarily adjusted by controlling the number of the tubes included in each of the first core portion, the second core portion, and the third core portion. Accordingly, a heat exchange efficiency of the exterior heat exchanger can be appropriately controlled in both the heating operation and the cooling operation.

What is claimed is:
1. A refrigeration cycle device comprising:
a compressor configured to compress and discharge a refrigerant;
a heating unit configured to heat blown air to be sent to an air conditioning target space by performing heat exchange between the refrigerant discharged from the compressor and the blown air;
an exterior heat exchanger configured to perform heat exchange between the refrigerant and outside air;

a first decompression unit configured to reduce pressure of the refrigerant flowing into the exterior heat exchanger;
a second decompression unit configured to reduce pressure of the refrigerant flowing out of the exterior heat exchanger;
an evaporator configured to cool the blown air before the heating unit heating the blown air, by performing heat exchange between the blown air and the refrigerant having a low pressure downstream of the second decompression unit; and
a refrigerant flow path switching unit configured to switch a refrigerant flow path of the refrigerant circulating in a cycle, wherein
the refrigerant flow path switching unit, in a heating operation for heating the blown air, switches to a refrigerant flow path where the refrigerant which has released heat at least in the heating unit is decompressed at the first decompression unit and evaporated in the exterior heat exchanger,
the refrigerant flow path switching unit, in a cooling operation for cooling the blown air, switches to a refrigerant flow path where the refrigerant which has released heat in the heating unit and the exterior heat exchanger is decompressed in the second decompression unit and evaporated in the evaporator,
the exterior heat exchanger includes a core portion that includes a stack of a plurality of tubes through which the refrigerant flows,
the core portion includes a first core portion, a second core portion and a third core portion each of which includes a tube group of the plurality of tubes,
a flow direction of the refrigerant flowing through the second core portion in the heating operation is opposite to a flow direction of the refrigerant flowing through the second core portion in the cooling operation,
flow directions of the refrigerant flowing through the first and third core portions in the heating operation are same as flow directions of the refrigerant flowing through the first and third core portions in the cooling operation
the exterior heat exchanger includes:
a refrigerant inflow portion configured to allow the refrigerant to flow into the first core portion through the refrigerant inflow portion;
a refrigerant inflow-outflow portion configured to allow the refrigerant to flow into and out of the second core portion through the refrigerant inflow-outflow portion; and
a refrigerant outflow portion configured to allow the refrigerant to flow out of the third core portion through the refrigerant outflow portion, and
the exterior heat exchanger is configured such that:
in the cooling operation, both the refrigerant flowing into the first core portion through the refrigerant inflow portion and the refrigerant flowing into the second core portion through the refrigerant inflow-outflow portion flow into the third core portion and flow out through the refrigerant outflow portion; and
in the heating operation, the refrigerant flowing into the first core portion through the refrigerant inflow portion flows into both the second core portion and the third core portion and flows out through the refrigerant inflow-outflow portion and the refrigerant outflow portion.

2. The refrigeration cycle device according to claim 1, wherein relationships $N1<N2+N3$ and $N1+N2>N3$ are satisfied, where $N1$ is a number of the tubes constituting the first core portion, $N2$ is a number of the tubes constituting the second core portion, and $N3$ is a number of the tubes constituting the third core portion.

3. The refrigeration cycle device according to claim 1, wherein
the refrigerant flow path switching unit switches, in the heating operation, to a refrigerant flow path where the refrigerant decompressed by the first decompression unit flows into the exterior heat exchanger through the refrigerant inflow portion, and flows out through the refrigerant inflow-outflow portion and the refrigerant outflow portion, and
the refrigerant flow path switching unit switches, in the cooling operation, to a refrigerant flow path where the refrigerant having released heat in the heating unit flows into the exterior heat exchanger through the refrigerant inflow portion and the refrigerant inflow-outflow portion, and flows out through the refrigerant outflow portion.

4. The refrigeration cycle device according to claim 1, wherein
the refrigerant flow path switching unit includes:
a first switching portion configured to switch between a refrigerant flow path configured to guide the refrigerant flowing out of the heating unit toward the first decompression unit, and a refrigerant flow path configured to guide the refrigerant flowing out of the heating unit toward the exterior heat exchanger bypassing the first decompression unit; and
a second switching portion configured to switch between a refrigerant flow path configured to guide the refrigerant flowing out of the exterior heat exchanger toward a suction side of the compressor, and a refrigerant flow path configured to guide the refrigerant flowing out of the exterior heat exchanger toward the second decompression unit, and
the first switching portion and the second switching portion are integrated into a single body.

5. The refrigeration cycle device according to claim 1, wherein the refrigerant flow path switching unit and the first decompression unit are integrated into a single body.

6. The refrigeration cycle device according to claim 5, wherein
the refrigerant flow path switching unit includes:
a first switching portion configured to switch between a refrigerant flow path configured to guide the refrigerant flowing out of the heating unit toward the first decompression unit, and a refrigerant flow path configured to guide the refrigerant flowing out of the heating unit toward the exterior heat exchanger bypassing the first decompression unit; and
a second switching portion configured to switch between a refrigerant flow path configured to guide the refrigerant flowing out of the exterior heat exchanger toward a suction side of the compressor, and a refrigerant flow path configured to guide the refrigerant flowing out of the exterior heat exchanger toward the second decompression unit, and
at least two of the first switching portion, the second switching portion, and the first decompression unit are driven by a common actuator.

7. The refrigeration cycle device according to claim 1, wherein the refrigerant flow path switching unit, the first decompression unit, and the exterior heat exchanger are integrated into a single body.

8. A refrigeration cycle device comprising:
a compressor configured to compress and discharge a refrigerant;
a heating heat exchanger configured to heat blown air to be sent to an air conditioning target space by performing heat exchange between the refrigerant discharged from the compressor and the blown air;
an exterior heat exchanger configured to perform heat exchange between the refrigerant and outside air;
a first throttle configured to reduce pressure of the refrigerant flowing into the exterior heat exchanger;
a second throttle configured to reduce pressure of the refrigerant flowing out of the exterior heat exchanger;
an evaporator configured to cool the blown air before the heating heat exchanger heating the blown air, by performing heat exchange between the blown air and the refrigerant having a low pressure downstream of the second throttle; and
a valve configured to switch a refrigerant flow path of the refrigerant circulating in a cycle, wherein
the valve, in a heating operation for heating the blown air, switches to a refrigerant flow path where the refrigerant which has released heat at least in the heating heat exchanger is decompressed at the first throttle and evaporated in the exterior heat exchanger,
the valve, in a cooling operation for cooling the blown air, switches to a refrigerant flow path where the refrigerant which has released heat in the heating heat exchanger and the exterior heat exchanger is decompressed in the second throttle and evaporated in the evaporator,
the exterior heat exchanger includes a core portion that includes a stack of a plurality of tubes through which the refrigerant flows,
the core portion includes a first core portion, a second core portion and a third core portion each of which includes a tube group of the plurality of tubes,
a flow direction of the refrigerant flowing through the second core portion in the heating operation is opposite to a flow direction of the refrigerant flowing through the second core portion in the cooling operation,
flow directions of the refrigerant flowing through the first and third core portions in the heating operation are same as flow directions of the refrigerant flowing through the first and third core portions in the cooling operation
the exterior heat exchanger includes:
a refrigerant inflow portion configured to allow the refrigerant to flow into the first core portion through the refrigerant inflow portion;
a refrigerant inflow-outflow portion configured to allow the refrigerant to flow into and out of the second core portion through the refrigerant inflow-outflow portion; and
a refrigerant outflow portion configured to allow the refrigerant to flow out of the third core portion through the refrigerant outflow portion, and
the exterior heat exchanger is configured such that:
in the cooling operation, both the refrigerant flowing into the first core portion through the refrigerant inflow portion and the refrigerant flowing into the second core portion through the refrigerant inflow-outflow portion flow into the third core portion and flow out through the refrigerant outflow portion; and
in the heating operation, the refrigerant flowing into the first core portion through the refrigerant inflow portion flows into both the second core portion and the third core portion and flows out through the refrigerant inflow-outflow portion and the refrigerant outflow portion.

9. A refrigeration cycle device comprising:
a refrigerant cycle configured to allow a refrigerant to circulate therein and exchange heat in a casing with blown air to be sent to an air conditioning target space;
an exterior heat exchanger coupled to the refrigerant cycle and positioned outside the casing to perform heat exchange between the refrigerant and air outside the air conditioning target space;
a valve provided in the refrigerant cycle and configured to change a refrigerant path in the refrigerant cycle; and
a controller controlling the valve, wherein
the exterior heat exchanger includes a core portion that includes a stack of tubes through which the refrigerant flows,
the core portion includes a first core portion, a second core portion and a third core portion each of which includes a tube group of the tubes,
the exterior heat exchanger includes:
a refrigerant inflow portion configured to allow the refrigerant to flow into the first core portion through the refrigerant inflow portion;
a refrigerant inflow-outflow portion configured to allow the refrigerant to flow into and out of the second core portion through the refrigerant inflow-outflow portion; and
a refrigerant outflow portion configured to allow the refrigerant to flow out of the third core portion through the refrigerant outflow portion,
the refrigerant cycle includes a first refrigerant path connected to the refrigerant inflow portion, a second refrigerant path connected to the refrigerant inflow-outflow portion, and a third refrigerant path connected to the refrigerant outflow portion,
the controller controls, in a heating operation for heating the blown air, the valve to separate the second refrigerant path from the first refrigerant path and connect the second refrigerant path to the third refrigerant path such that the refrigerant flows into the exterior heat exchanger through the refrigerant inflow portion and flows out of the exterior heat exchanger through the refrigerant inflow-outflow portion and the refrigerant outflow portion, and
the controller controls, in a cooling operation for cooling the blown air, the valve to separate the second refrigerant path from the third refrigerant path and connect the second refrigerant path to the first refrigerant path such that the refrigerant flows into the exterior heat exchanger through the refrigerant inflow portion and the refrigerant inflow-outflow portion and flows out of the exterior heat exchanger through the refrigerant outflow portion.

* * * * *